United States Patent
Tristram et al.

(10) Patent No.: US 9,382,158 B2
(45) Date of Patent: Jul. 5, 2016

(54) METHOD OF PREPARING A COLOURED SELF-LEVELLING CEMENTITIOUS FLOOR COVERING

(71) Applicants: Cameron James Tristram, Auckland (NZ); Rachel D'Arcy Lacy, Auckland (NZ)

(72) Inventors: Cameron James Tristram, Auckland (NZ); Rachel D'Arcy Lacy, Auckland (NZ)

(73) Assignee: DRIKOLOR INC, Mar Vista, CA (US)

(*) Notice: Subject to any disclaimer, the term of this patent is extended or adjusted under 35 U.S.C. 154(b) by 0 days.

(21) Appl. No.: 14/720,882

(22) Filed: May 25, 2015

(65) Prior Publication Data

US 2015/0336849 A1 Nov. 26, 2015

(30) Foreign Application Priority Data

May 23, 2014 (NZ) ........................................ 625465
Jun. 18, 2014 (NZ) ........................................ 626451

(51) Int. Cl.

| | |
|---|---|
| *C04B 24/26* | (2006.01) |
| *C04B 14/02* | (2006.01) |
| *C04B 14/30* | (2006.01) |
| *C04B 16/00* | (2006.01) |
| *C04B 22/06* | (2006.01) |
| *C04B 24/00* | (2006.01) |
| *C04B 24/02* | (2006.01) |
| *C04B 24/32* | (2006.01) |
| *C04B 28/08* | (2006.01) |
| *C09C 1/48* | (2006.01) |
| *C09C 3/00* | (2006.01) |

(Continued)

(52) U.S. Cl.
CPC ........... *C04B 24/2641* (2013.01); *C04B 14/022* (2013.01); *C04B 14/30* (2013.01); *C04B 14/305* (2013.01); *C04B 14/307* (2013.01); *C04B 14/308* (2013.01); *C04B 16/00* (2013.01); *C04B 22/06* (2013.01); *C04B 24/00* (2013.01); *C04B 24/02* (2013.01); *C04B 24/32* (2013.01); *C04B 28/08* (2013.01); *C09C 1/00* (2013.01); *C09C 1/24* (2013.01); *C09C 1/30* (2013.01); *C09C 1/346* (2013.01); *C09C 1/48* (2013.01); *C09C 3/00* (2013.01)

(58) Field of Classification Search
None
See application file for complete search history.

(56) References Cited

U.S. PATENT DOCUMENTS 5,846,315 A * 12/1998 Johansen, Jr. ............. B28C 7/12
106/401
5,961,710 A * 10/1999 Linde .................... C04B 18/022
106/428

(Continued)

FOREIGN PATENT DOCUMENTS

WO WO 01/74735 A1 10/2001

OTHER PUBLICATIONS

PCT International Search Report issued in PCT/NZ2015/050065 (mailed Aug. 19, 2015).

*Primary Examiner* — Satya Sastri
(74) *Attorney, Agent, or Firm* — Nixon & Vanderhye P.C.

(57) ABSTRACT

Method of preparing a colored self-levelling cementitious floor covering by mixing a colorant with a cementitious floor covering premix used in forming of the colored self-levelling cementitious floor covering. The colorant is a flowable, spray-dried, particulate formulation prepared from a mixture of ingredients in water containing 85 to 95% by weight of one or more inorganic pigments, 3 to 7% by weight of poly(ethylene glycol) having a median molecular weight in the range 7,000 to 9,000, 3 to 6% by weight carboxylated acrylic co-polymer dispersant and 0.5 to 2.0% by weight hydroxylated amine.

4 Claims, 6 Drawing Sheets

(51) Int. Cl.
*C09C 1/00* (2006.01)
*C09C 1/24* (2006.01)
*C09C 1/30* (2006.01)
*C09C 1/34* (2006.01)

(56) References Cited

U.S. PATENT DOCUMENTS

| | | | |
|---|---|---|---|
| 6,132,505 A * | 10/2000 | Linde | C04B 18/02 106/429 |
| 6,695,990 B1 * | 2/2004 | Dunnous | C04B 18/028 106/456 |
| 6,972,305 B1 | 12/2005 | Griessmann et al. | |
| 7,365,109 B2 | 4/2008 | Rathschlag et al. | |
| 2002/0185040 A1 * | 12/2002 | Egger et al. | 106/456 |
| 2004/0040469 A1 * | 3/2004 | McAulay | C04B 18/028 106/453 |
| 2004/0112254 A1 | 6/2004 | Egger et al. | |
| 2006/0000392 A1 * | 1/2006 | Reisacher et al. | 106/499 |
| 2011/0265693 A1 * | 11/2011 | Hoetzl et al. | 106/778 |

* cited by examiner

METHOD OF PREPARING A COLOURED SELF-LEVELLING CEMENTITIOUS FLOOR COVERING

FIELD OF INVENTION

The invention relates to methods of colouring cementitious building materials, such as concrete, and formulations for use in these methods. In particular, the invention relates to a method of colouring concrete used in floor levelling and repair.

BACKGROUND ART

Cementitious building materials such as concrete are used in large volumes throughout the world. By varying the proportions of ingredients used in the cementitious premix, many types of concrete are available. These include floor levelling and repair products. Such products are used, for example, in preparing a floor prior to the laying of a covering such as carpet or vinyl. These products are designed to find their own levels when installed at a thickness of 3 mm or greater. Once hydrated and poured the cementitious mix hardens and sets rapidly so that it can be walked on within as little as two to three hours. It is often desired to improve the aesthetic qualities of building materials by introducing colour. To achieve this the surface of the building material may be either dyed or colour added during the forming of the material (referred to here as "integral colouring").

As discussed in the publication of Hertz et al (2012) several methods for dyeing a concrete surface are known. A first method involves washing the surface with an acidic solution containing a metal salt. Following development of the colour a neutralising agent, then a clear protective polymeric sealing coating are applied. A second method involves washing the surface with an acidic solution to roughen or etch the surface before colouring the surface with a polymer based stain or paint and finishing with a clear coating. A third method involves etching or grinding the surface before applying a cementitious overlay. The cementitious overlay is then stained with an acidic solution containing a metal salt. These methods are generally disadvantageous due to the use of highly corrosive acidic solutions which are hazardous to handle.

Historically, the integral colouring of concrete has been achieved by adding formulations of inorganic pigments such as iron oxide to the hydrated premix. A range of earth tones are thereby obtainable. Ingredients used in the cementitious premix, such as those added to provide integral colour or the requisite "self-levelling" properties of floor levelling and repair products, must not adversely affect the durability and strength of the building material once formed. Furthermore, ingredients added to a cementitious premix to provide colour should not interfere with the function of additives included, for example, to provide "self-levelling" properties. By way of illustration, inorganic pigments such as iron oxide can inhibit the performance of shrinkage-compensating additives used in floor levelling and repair products resulting in cracking. Many different formulations of pigments have been proposed for integral colouring of cementitious building materials, especially concrete.

The publication of Tomkinson (1971) discloses colouring materials deposited on iron oxide particles obtained by precipitation. Preferred colouring materials include carbon black, azo colouring materials, vat dyes (anthraquinoid and indigoid) and phthalocyanine colouring materials. The pigments thereby provided are proposed for use in colouring concrete, tile and brick.

The publication of Bowen (1980) states that it is difficult to obtain a sufficiently thorough mixing of powders into a wet cement mix so as to achieve a homogenous colour throughout the mixture. The publication discloses stabilized thixotropic slurries for colouring concrete comprising pigment, at least one stabilizer, a dispersant and water.

The publication of Jungk (1990) discloses granules for use in colouring concrete consisting of one or more pigments and one or more binders for promoting the dispersing of the pigments in the concrete. Ammonium lignin sulfonated powder is used as the binder.

The publication of Kröckert and Linde (1993) discloses a process for colouring building materials. The process uses inorganic pigments (iron oxides, titanium oxide) formulated as granules. The granules are prepared by spray-drying aqueous suspensions of 38 to 55% by weight of the inorganic pigments and 0.3 to 1.3% by weight of soluble salts. The granules are asserted to have at least satisfactory flow behaviour and rapid dispersibility in concrete.

The publication of Linde and Eitel (1996) discloses a process for the colouration of building materials such as concrete by granulated inorganic pigments. The commercially available formulations of inorganic pigments (Bayer AG) are mixed with a small amount of machine or vegetable oil, compacted and then granulated to provide material with a grain size of 0.2 to 2 mm.

The publication of Köhler et al (1998) discloses a process for the preparation of iron oxide black pigment granules which are stable to handling. The process includes a step of tempering spray-dried granules of iron oxide black pigment in an indirectly heated rotary kiln at temperatures below 65° C. in an inert nitrogen atmosphere for approximately 30 to 60 minutes. The granules are asserted to have high strength, dispersibility and stability to oxidation.

The publication of Will (1998) discusses how many inorganic pigments, such as metal oxides, do not disperse well in cementitious systems. The publication discloses a method for colouring cementitious systems using compacted inorganic granules. The compacted inorganic granules comprise an inorganic pigment and a dispersing agent.

The publication of Johansen et al (1999) discloses an aqueous composition for colouring cement-based composition comprising water, pigment, a suspension enhancing agent and latex polymer solids. A mixture of predetermined amounts of a cement-based component and the aqueous composition is asserted to provide a cement-based composition of uniform and standardised colour that is capable of being consistently reproduced.

The publication of Supplee (2003) discloses a composition for colouring concrete. In addition to the colourant the composition includes a stearic acid, salt or derivative as a hydrophobic efflorescence control agent. The composition also includes particulated polymers and co-polymers. The composition is asserted to improve durability of the coloured concrete.

The publication of Dunnous and Yocum (2004) discloses pigment-containing granules for use in colouring concrete. The publication states that forming granules with a soluble organic binder by spray-drying can be problematic due to the high temperature air flow used. It is asserted that if charring of the soluble organic binder occurs it will no longer be readily soluble in water. This technical problem is avoided in the method disclosed by using an insoluble, pozzolanic clay (aluminium silicate) agglomerator.

The publication of Noack and Herrmann (2004) discloses colouring pigment granulates. The granulates comprise granulated cores that do not contain binders, emulsifying agents, surface active agents, dispersing agents, or preservatives. The granulates cores are enclosed by an enveloping layer made of a material such as polyvinyl alcohol, that can be broken down. The absence of binders and other auxiliaries is asserted to ensure rapid disagglomeration once the shell enveloping material is broken down.

The publication of Supplee (2007) discloses compositions for colouring concrete when integrally or surface-shake applied. The composition comprises a spray-dried styrene acrylic polymer encapsulated colourant and a second polymer for use in dispersing the encapsulated colourant.

The standard of Anon (2010) prescribes that coloured concrete pigmented at a maximum dosage rate of 10% by weight of the cement shall have a 28-day compressive strength of not less than 90% and a water to cement ratio of not greater than 110% of that of the control. The standard further prescribes that when added to concrete at the maximum dosage rate, the pigment is to neither accelerate the initial or final set by more than one hour nor retard the initial or final set by more than one and a half hours, and the air content is not be changed by more than 1% as compared to the control.

It is an object of the invention to provide a method of colouring concrete capable of complying with the requirements of the standard of Anon (2010). It is an object of the invention to provide colourants for use in the method. These objects are to be read disjunctively with the object to provide at least a useful choice in the colouring of cementitious building materials.

STATEMENT OF INVENTION

In a first aspect the invention provides a flowable, spray dried, particulate formulation suitable for use in colouring cementitious building materials comprising in admixture one or more inorganic pigments, poly(ethylene glycol), hydroxylated amine and polycarboxylic acid.

Preferably, the one or more pigments of the formulation are inorganic pigments selected from the group consisting of: synthetic iron oxides (black, browns, red and yellows); natural iron oxides; chromium oxide; cobalt blue; cobalt green; titanium dioxide and carbon black (concrete grade).

Preferably, the first aspect of the invention provides a flowable, spray dried, particulate formulation consisting essentially of one or more inorganic pigments, poly(ethylene glycol), hydroxylated amine and polycarboxylic acid in admixture.

Preferably, the formulation comprises poly(ethylene glycol), polycarboxylic acid dispersant and hydroxylated amine in a 2-6:2-6:1 ratio by weight. More preferably, the formulation comprises poly(ethylene glycol), polycarboxylic acid dispersant and hydroxylated amine in a 2-4:4-6:1 ratio by weight. Most preferably, the formulation comprises in admixture poly(ethylene glycol), polycarboxylic acid dispersant and hydroxylated amine in a 3:5:1 ratio by weight.

Preferably, the poly(ethylene glycol) has a median molecular weight in the range 7,000 to 9,000 (PEG 8000).

Preferably, the hydroxylated amine is 2-amino-2-methyl-1-propanol. A preferred 2-amino-2-methyl-1-propanol is supplied under the trade name AMP 95™ (CAS#124-68-5).

Preferably, the polycarboxylic acid dispersant is a carboxylated acrylic co-polymer. A preferred acrylic acid polymer is supplied under the trade name RHODOLINE 226/40™ (CAS# 9003-04-7).

Preferably, the polycarboxylic acid is less than 5% by weight of the formulation.

Preferably, the formulation consists essentially of the one or more inorganic pigments, the poly(ethylene glycol), the polycarboxylic acid dispersant and the hydroxylated amine in a 45-160:2-6:2-6:1 ratio by weight. More preferably, the formulation consists essentially of the one or more pigments, the poly(ethylene glycol), the polycarboxylic acid dispersant and the hydroxylated amine in a 45-125:2-6:2-6:1 ratio by weight. Yet more preferably, the formulation consists essentially of the one or more pigments, the poly(ethylene glycol), the polycarboxylic acid dispersant and the hydroxylated amine in a 45-110:2-6:2-6:1 ratio by weight. Most preferably, the formulation consists essentially of the one or more pigments, the poly(ethylene glycol), the polycarboxylic acid dispersant and the hydroxylated amine in a 45-110:3:5:1 ratio by weight.

Preferably, the particles of the formulation are of a hollow doughnut morphology with a median diameter in the range 20 to 150 μm. More preferably, the particles of the formulation are of a hollow doughnut morphology with a median diameter of 30 to 50 μm.

In a preferred embodiment of the first aspect the invention provides a colourant product that is a flowable, spray-dried, particulate formulation consisting essentially of 85 to 95% by weight of one or more inorganic pigments, 3 to 7% by weight of poly(ethylene glycol) having a median molecular weight in the range 7,000 to 9,000 (PEG 8000), 3 to 6% by weight carboxylated acrylic co-polymer dispersant and 0.5 to 2.0% by weight hydroxylated amine.

In a second aspect the invention provides a method of colouring a cementitious building material comprising the step of mixing a formulation of the first aspect of the invention with a cementitious premix.

Preferably, the cementitious premix is hydrated immediately prior to the step of mixing the formulation with the cementitious premix. More preferably, the cementitious premix is a floor levelling or repair product.

Preferably, the cementitious building material is selected from the group consisting of: concrete, mortar and plaster.

In a third aspect the invention provides an integrally coloured cementitious building material comprising one or more pigments, poly(ethylene glycol), polycarboxylic acid and hydroxylated amine.

Preferably, the cementitious building material is selected from the group consisting of: concrete, mortar and plaster. More preferably, the building material is concrete. Most preferably, the building material is a levelled or repaired concrete floor.

In the description and claims of this specification the following acronyms, terms and phrases have the meaning provided: "admixture" means an intimate, uniform mixture of two or more components; "building material" means a hardened cementitious material including concrete, mortar and plaster; "calcining" means reducing, oxidising or desiccating by roasting or strong heat; "cement" means a powdery substance made by calcining lime and clay used in making mortar and concrete; "cementitious building material" means a building material prepared by mixing cement and water with or without the addition of aggregate or sand; "cementitious premix" means a mixture of cement and water used in the forming of a building material such as concrete, mortar or plaster; "colourant" means a formulation including primary particles of one or more pigments used in preparing a coloured base medium such as a cementitious building material; "colouring" means dispersing one or more pigments uniformly throughout a building material and "coloured" has a corresponding meaning; "comprising" means "including", "containing" or "characterized by" and does not exclude any additional element, ingredient or step; "concrete" means a building material made from a mixture of ingredients including gravel, sand, cement and water forming a stone-like mass on hardening; "consisting of" means excluding any element, ingredient or step not specified except for impurities and other incidentals; "consisting essentially of" means excluding any element, ingredient or step that is a material limitation; "copolymer" means a polymer formed by the polymerization of two or more different monomers; "flowable" means capable of being poured from a container or package; "formula" means a list of ingredients with which a formulation is prepared; "formulant" means an ingredient used in the preparation of a formulation; "formulation" means a material or mixture prepared according to a formula; "hydrophilic" means having a tendency to mix with, dissolve in, or be wetted by water; "hydrophobic" means having a tendency to repel or fail to mix with water; "integrally coloured" means particles of pigment are distributed throughout the body of the material; "mortar" means a mixture of cement and water used in building to bond bricks or stones; "pigment" means a material or substance used for colouring; "plaster" means a mixture of sand and cement and sometimes lime with water, for spreading on walls, ceilings, or other structures, to form a smooth hard surface when dried; "plurality" means two or more; "premix" means a flowable mixture used in the preparation of a building material prior to mixing with water (hydration); "primary particles" means the smallest particles of a comminuted material or substance; "product" means a formulation packaged and identified for a specified use; "synthetic" means prepared by chemical synthesis.

The terms "first", "second", "third", etc. used with reference to elements, features or integers of the subject matter defined in the Statement of Invention and Claims, or when used with reference to alternative embodiments of the invention are not intended to imply an order of preference.

Where the presence, concentration or a ratio of ingredients is specified the presence, concentration or ratio specified is the initial presence, concentration. Where values are expressed to one or more decimal places standard rounding applies. For example, 1.7 encompasses the range 1.650 recurring to 1.7499 recurring.

The invention will now be described with reference to embodiments or examples and the figures of the accompanying drawings pages. Throughout the following description the term "colourant" is used to refer to the formulations of the examples.

DETAILED DESCRIPTION

The hydration of cementitious premixes by the addition of water initiates ettringite formation. This primary ettringite formation is important in the hardening and setting of concrete and is to be distinguished from the delayed ettringite formation associated with damage to hardened concrete. During the first hours of hydration the shape and size of the ettringite crystals is influenced by the composition of the alkaline solution in which the crystals are forming. The hardening and setting of concrete can be monitored by calorimetric methods.

Figure 1:
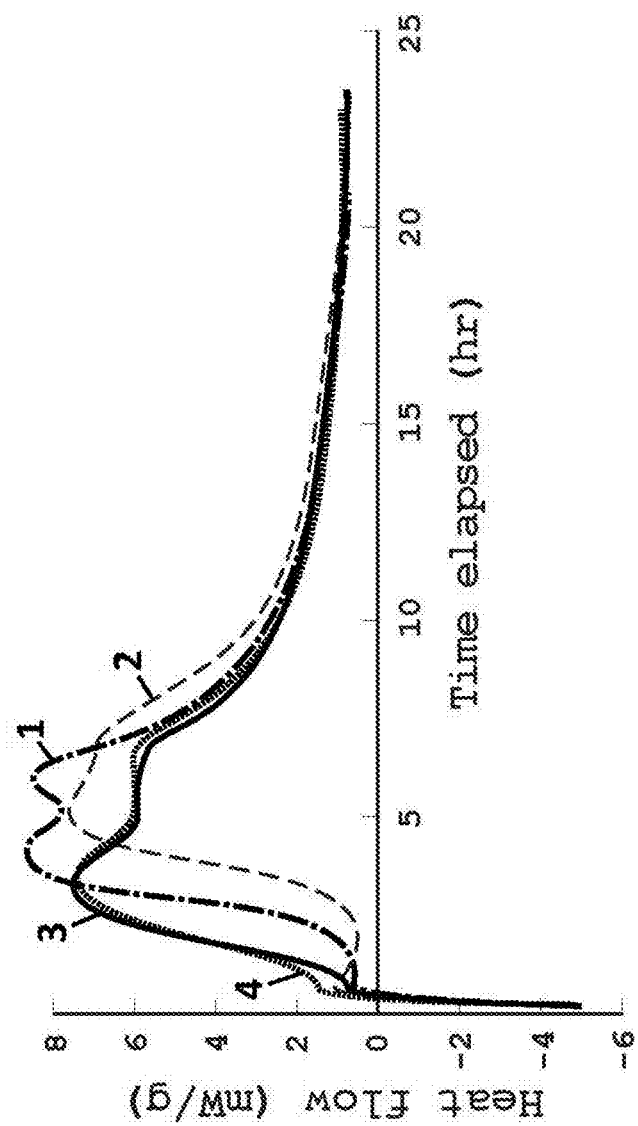
FIG. 1. Heat output curves for mortars prepared using cement sourced from Golden Bay (plots 2 and 4) or Holcim (plots 1 and 3) with (plots 1 and 2) or without (plots 3 and 4) the addition of 2% (w/w) of a superplasticiser (CD31).

In addition to their ability to effectively disperse the primary particles of inorganic pigments, the selection of formulants for use in the colouring of concrete must also consider the potentially deleterious effect the presence of the formulants in the alkaline solution will have on primary ettringite formation. The formulants used in cementitious building materials are often observed to influence the characteristics of primary ettringite formation (FIG. 1).

A deleterious effect on primary ettringite formation is likely to be exacerbated when colouring cementitious premixes formulated for use as rapid setting floor levelling and repair products. These products are designed to find their own levels when installed at a thickness of 3 mm or greater. Once hydrated and poured the cementitious mix hardens and sets rapidly so that it can be walked on within as little as two to three hours. The cementitious premixes used in floor levelling and repair are formulated with specially selected polymers to provide these performance characteristics.

The invention resides partly in the selection of a combination of formulants that do not have a significant deleterious effect on the hardening and setting of cementitious building materials when mixed with a hydrated cementitious premix. The invention also resides partly in this combination of formulants being compatible with the spray drying of aqueous formulations of the inorganic pigments used in colouring cementitious building materials. The invention permits the formulation of a range of these pigments as flowable granules of uniform density that may be dispensed gravimetrically or volumetrically, thereby facilitating the use of these pigments in colouring cementitious building materials.

The invention will be illustrated with reference to the use of the combination of a poly(ethylene glycol), a polycarboxylic acid and a hydroxylated amine in the preparation of flowable, spray dried, particulate formulations of inorganic pigments that readily disperse when added to hydrated cementitious premixes. The use of this combination of formulants does not adversely affect the primary ettringite formation as evidenced by no observed deleterious effects on the hardening and setting of the building material.

Preparation of Colourants

Figure 2:
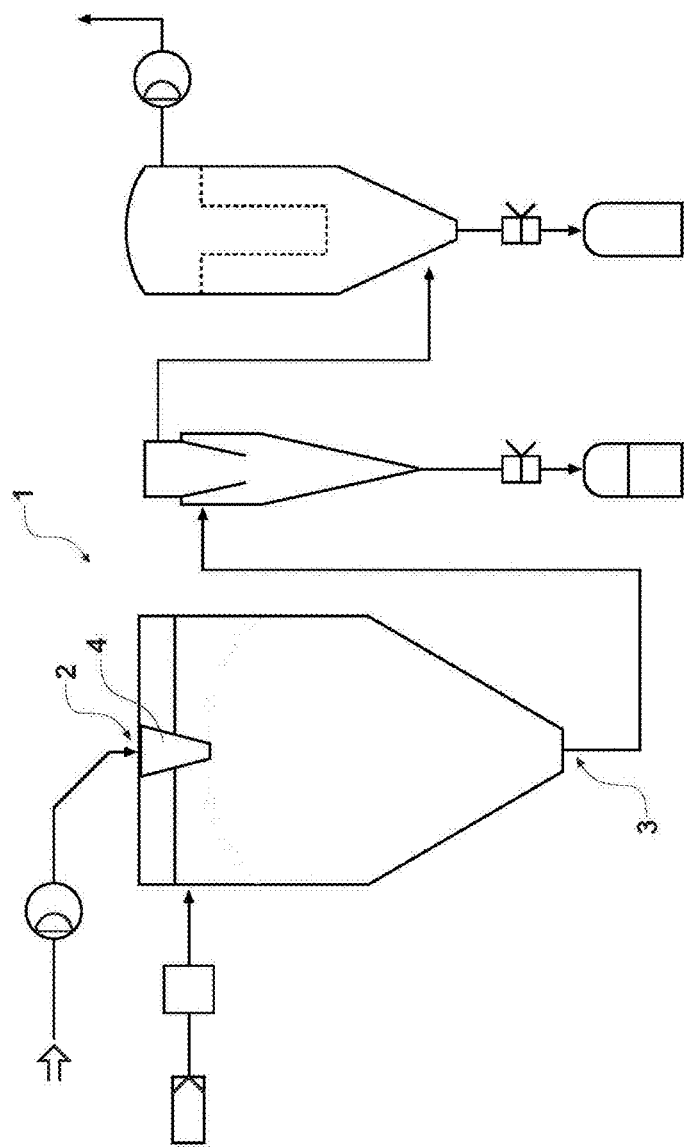
FIG. 2. Schematic representation of a single-point discharge configuration of a spray dryer (1) of the type used in the methods described provided with an inlet (2), an outlet (3) and a rotary atomiser (4).

The flowable, spray dried, particulate formulations are prepared by dispersing the pigments in an aqueous solution of the formulants. Dispersions of different pigments may be blended if desired prior to spray drying. A schematic representation of single-point discharge configuration of a spray dryer fitted with a rotary atomiser is provided in FIG. 2.

EXAMPLES

Example 1

A solution of poly(ethylene glycol) [8,000 g/mol] (PEG 8000) in water was prepared at a ratio of 10% (w/w) by dissolving 90 g of the PEG 8000 in 900 g of water with gentle agitation. The solution was then blended with 150 g of a polycarboxylic acid dispersant (RHODOLINE 226/40) and 30 g of a hydroxylated amine (AMP 95). Following homogenisation of the blended mix using a high speed disperser, 3,000 g of green oxide pigment was slowly added with continuous stirring up to 3,000 rpm for a total of 80 minutes to provide a homogenous dispersion. The homogenous dispersion was then spray-dried using a GEA Niro MOBILE MINOR™ (GEA Process Engineering) equipped with a rotary atomiser (channel wheel, 20,000 rpm) in a single-point discharge configuration and operated at an inlet temperature of 185° C. and outlet temperature of 95° C. A particulate formulation of hollow doughnut morphology with a median particle diameter of 30 μm was obtained at a rate of 1.9 Kg/hour (1.2% w/w moisture content) with 52% yield.

Example 2

A selection of poly(ethylene glycol) [8,000 g/mol] (PEG 8000) in water was prepared at a ratio of 6% (w/w) by dissolving 75 g of the PEG 8000 in 1250 g of water with gentle agitation. The solution was then blended with 125 g of a polycarboxylic acid dispersant (RHODOLINE™ 226/40) and 25 g of a hydroxylated amine (AMP 95). Following homogenisation of the blended mix using a high speed disperser, 2,500 g of red ochre pigment was slowly added to provide a raw homogenous dispersion. The raw homogenous dispersion was then ball-milled for a total of 12 hours to provide a final milled homogenous dispersion. The homogenous dispersion was then spray-dried using a GEA Niro MOBILE MINOR™ (GEA Process Engineering) equipped with a rotary atomiser (channel wheel, 20,000 rpm) in a single-point discharge configuration and operated at an inlet temperature of 185° C. and outlet temperature of 95° C. A particulate formulation of hollow doughnut morphology with a median particle diameter of 30 μm was obtained at a rate of 1.9 Kg/hour (1.2% w/w moisture content) with 52% yield.

Similar quantities of colourants (Examples 3 to 6) were prepared by methods similar to those employed for the preparation of the colourants of Example 1 and Example 2. Larger quantities of colourants (Examples 7 to 9) were prepared using a GEA Niro VERSATILE-SD™ 6.3N (GEA Process Engineering).

The colourant of Example 7 was spray-dried with an inlet temperature of 230° C. and an outlet temperature of 85° C. at a production rate of 23 Kg/h with a pressure nozzle configuration and final moisture content of less than 1.5%.

The colourant of Example 8 was spray-dried with an inlet temperature of 230° C. and an outlet temperature of 95° C. at a production rate of 55 Kg/h with a pressure nozzle configuration and final moisture content of less than 1.5%.

The colourant of Example 9 was spray-dried with an inlet temperature of 220° C. and an outlet temperature of 90° C. at a production rate of 60 Kg/h with a pressure nozzle configuration and final moisture content of less than 1.5%.

Example 3

| Ingredient (with 300 g water) | Quantity (g) | Ratio |
|---|---|---|
| Bluish red iron oxide (R5580) | 718.0 | 160 |
| Poly(ethylene glycol) (PEG 400) | 26.0 | 5.8 |
| Polycarboxylic acid dispersant (RHODOLINE ™ 226/40) | 26.6 | 5.9 |
| Hydroxylated amine (AMP 95) | 4.5 | 1 |

Example 4

| Ingredient (with 211 g water) | Quantity (g) | Ratio |
|---|---|---|
| Dark brown iron oxide (Umber 190) | 645.0 | 53 |
| Fumed silica (Aerosil 200) | 3.9 | |
| Poly(ethylene glycol) (PEG 400) | 50.0 | 4.0 |
| Polycarboxylic acid dispersant (RHODOLINE ™ 226/40) | 40.0 | 3.3 |
| Hydroxylated amine (AMP 95) | 12.3 | 1 |

Example 5

| Ingredient (with 390 g water) | Quantity (g) | Ratio |
|---|---|---|
| Natural red iron oxide (Kremer 48600) | 520.0 | 75 |
| Fumed silica (Aerosil 200) | 3.8 | |
| Poly(ethylene glycol) (PEG 400) | 16.6 | 2.4 |
| Polycarboxylic acid dispersant (RHODOLINE ™ 226/40) | 20.0 | 2.9 |
| Hydroxylated amine (AMP 95) | 7.0 | 1 |

Example 6

| Ingredient (with 275 g water) | Quantity (g) | Ratio |
|---|---|---|
| English red light iron oxide (Kremer 40542) | 771.0 | 114 |
| Fumed silica (Aerosil 200) | 5.0 | |
| Poly(ethylene glycol) (PEG 400) | 26.0 | 3.8 |
| Polycarboxylic acid dispersant (RHODOLINE ™ 226/40) | 31.0 | 4.6 |
| Hydroxylated amine (AMP 95) | 6.8 | 1 |

Example 7

| Ingredient (with 1431.8 Kg water) | Quantity (Kg) | Ratio |
|---|---|---|
| Carbon black | 954.5 | 100 |
| Poly(ethylene glycol) (PEG 8000) | 28.6 | 3 |
| Polycarboxylic acid dispersant (RHODOLINE ™ 226/40) | 38.2 | 4 |
| Hydroxylated amine (AMP 95) | 9.5 | 1 |

Example 8

| Ingredient (with 111.6 Kg water) | Quantity (Kg) | Ratio |
|---|---|---|
| Iron oxide red (Red 5530)(Nubolia)(CAS# 1309-37-1) | 450.3 | 100 |
| Poly(ethylene glycol) (PEG 8000) | 13.5 | 3 |
| Polycarboxylic acid dispersant (RHODOLINE 226/40) | 20.1 | 4.5 |
| Hydroxylated amine (AMP 95) | 4.5 | 1 |

Example 9

| Ingredient (with 42.49 Kg water) | Quantity (Kg) | Ratio |
|---|---|---|
| Iron oxide red (Red 5530)(Nubolia)(CAS# 1309-37-1) | 73.4 | 100 |
| Iron oxide yellow (Yellow 5021)(Bayferrox)(CAS# 51274-00-1) | 39.5 | |
| Poly(ethylene glycol) (PEG 8000) | 3.39 | 3 |
| Polycarboxylic acid dispersant (RHODOLINE ™ 226/40) | 5.08 | 4.5 |
| Hydroxylated amine (AMP 95) | 1.13 | 1 |

Comparative Examples

To evaluate the effect of varying the concentrations and ratios of the ingredients on performance a series of spray-dried colourants were prepared of the following composition:

TABLE 1

Compositions of a series of spray-dried colourants comprising chrome green oxide as the pigment. The quantities of the ingredients are expressed as a percentage by weight of the pigment.

| Ingredient | G1 | G2 | G3 | G4 | G5 | G6 | G7 |
|---|---|---|---|---|---|---|---|
| Poly(ethylene glycol) (PEG 8000) | 6 | 6 | 6 | 6 | 6 | 3 | 14.4 |
| Polycarboxylic acid dispersant (RHODOLINE ™ 226/40) | 1.4 | 3.6 | 5 | 7.5 | 5 | 5 | 6 |
| Hydroxylated amine (AMP 95) | 1 | 1 | 1 | 1 | 5 | 1 | 1.2 |

Each one of the spray-dried colourants from the series was evaluated by mixing at a rate of 2% (w/w) with a slurry of cementitious building material consisting of 225 g water, 500 g dry sand and 1,000 g ordinary Portland cement.

Yellowing of the surface of the pigmented building material prepared from colourant G4 indicated an upper limit for inclusion of the ingredient RHODOLINE 226/40 of 5% by weight. The best handling and performance characteristics were observed for colourants G1 and G5 indicating a preferred ratio by weight of the ingredient RHODOLINE 226/40 to AMP-95 of around 1.

Other ingredients were evaluated as alternatives to the use of poly(ethylene glycol) as a formulant. As before batches of trial formulations were spray-dried using either the GEA Niro MOBILE MINOR™ (GEA Process Engineering) or a Mini Spray Dryer B-290 (Buchi). Spray-drying parameters were optimised for each trial formulation. The ingredients employed in these other formulations and observations concerning the performance of the product of spray-drying are provided as comparative examples only and are not embodiments of the invention.

Comparative Example 1

| Ingredient (with 114.6 g water) | Quantity (g) |
|---|---|
| Yellow iron oxide (pigment code PY42)(CAS# 51274-00-1) | 91.3 |
| Sodium silicate | 2.1 |
| Polycarboxylic acid dispersant (RHODOLINE ™ 226/40) | 0.6 |
| Hydroxylated amine (AMP 95) | 0.4 |

The formulation was spray-dried using the Mini Spray Dryer B-290 (Buchi) with an inlet temperature of 180° C. and an outlet temperature of 105° C. The product of spray-drying would not disperse when added to an aqueous slurry of concrete. This was attributed to a surface layer of sodium silicate not hydrating rapidly enough to release the primary particles of pigment.

Comparative Example 2

| Ingredient (with 1258.1 g water) | Quantity (g) |
|---|---|
| Yellow iron oxide (pigment code PY42)(CAS# 51274-00-1) | 1979.7 |
| Titanium dioxide | 1979.7 |
| 682 | 5.5 |
| Polydextrose | 407.0 |
| Polycarboxylic acid dispersant (RHODOLINE ™ 226/40) | 36.0 |
| Hydroxylated amine (AMP 95) | 10.7 |

The formulation was spray-dried using the GEA Niro MOBILE MINOR™ with an inlet temperature of 180° C., an outlet temperature of 95° C. and a spindle speed of 15,000 rpm. The product of spray-drying was mixed at a rate of 3% (w/w) with a slurry of cement (1:2 (w/w) water-cement) comprising no aggregate. Hydration of the cementitious mix was found to be indefinitely retarded.

Comparative Example 3

| Ingredient (with 150 g water) | Quantity (g) |
|---|---|
| GO | 200 |
| Polyvinyl alcohol (MONOSOL ™) | 12 |
| Polycarboxylic acid dispersant (RHODOLINE ™ 226/40) | 9 |
| Hydroxylated amine (AMP 95) | 3 |

The formulation was spray-dried using the Mini Spray Dryer B-290 (Buchi) with an inlet temperature of 180° C. and an outlet temperature of 105° C. The product of spray-drying was mixed at a rate of 4% (w/w) with a slurry of cement (1:2 (w/w) water-cement). Product prepared with either of the trade name products MONOSOL™ 8900 or MONOSOL™ BP-3 both displayed poor handling characteristics accompanied by foam generation and retention in the admixture.

Evaluation of Colourants

The colourants of Example 3, Example 4, Example 5 and Example 6 were evaluated for use in colouring concrete or mortar prepared using cement from three different sources (Golden Bay, Holcim and Dricon). The colourants were evaluated against their corresponding unformulated pigments (milled iron oxides) with (Example 4, Example 5 and Example 6) or without (Example 3) the addition of fumed silica. The colourants were evaluated for any adverse effects on the setting and hardening characteristics of the resulting cementitious building material. Calorimetry was used to evaluate early age hydration of the cementitious building material. Compressive strengths of 50 mm cubes of cement mortar was determined at 48 hours, 7 days and 28 days.

Calorimetry

Figure 3:
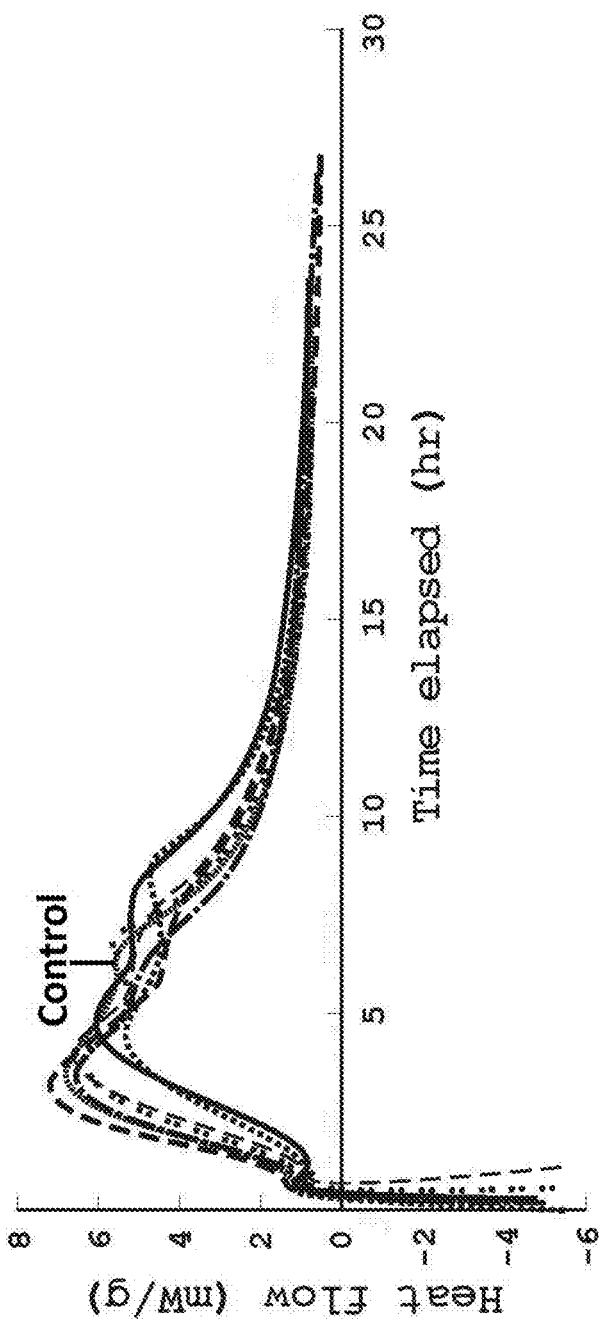
FIG. 3. Heat output curves for coloured mortars prepared using unformulated pigments and corresponding formulations prepared according to the invention. Heat output curves are shown overlain on the heat output curve for unadulterated cement (Control). All mortars were prepared using cement sourced from Golden Bay.
Figure 4:
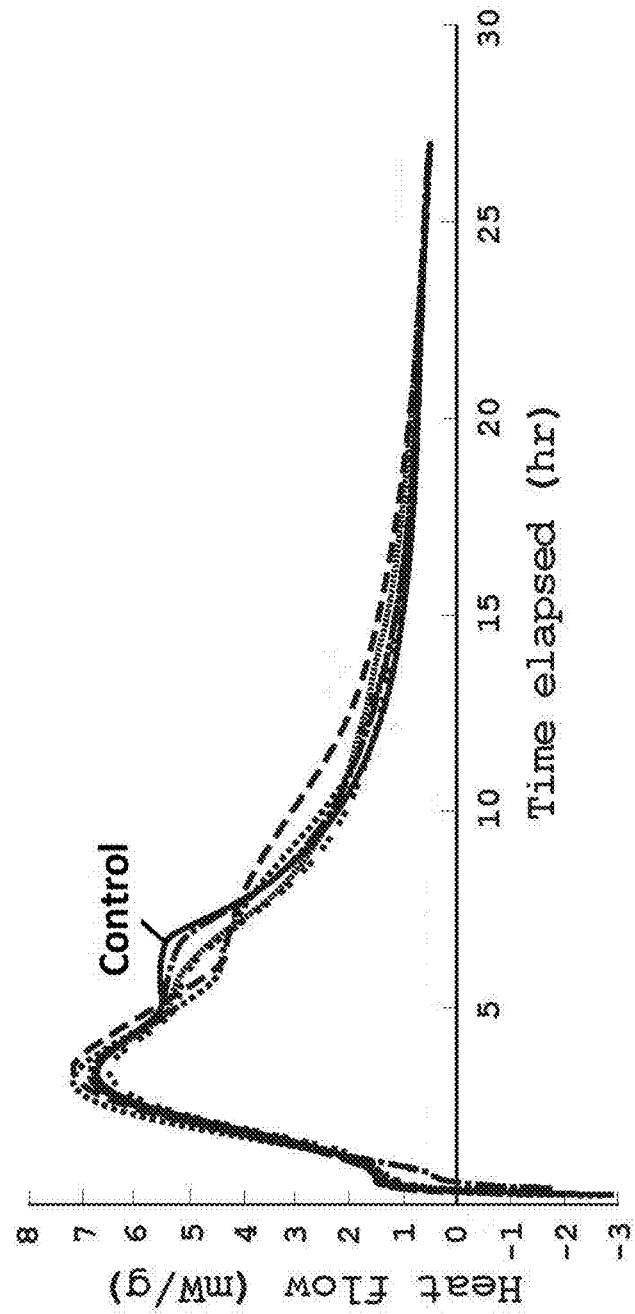
FIG. 4. Heat output curves for coloured mortars prepared using unformulated pigments and corresponding formulations. Heat output curves are shown overlain on the heat output curve for unadulterated cement (Control). All mortars were prepared using cement sourced from Holcim.
Figure 5:
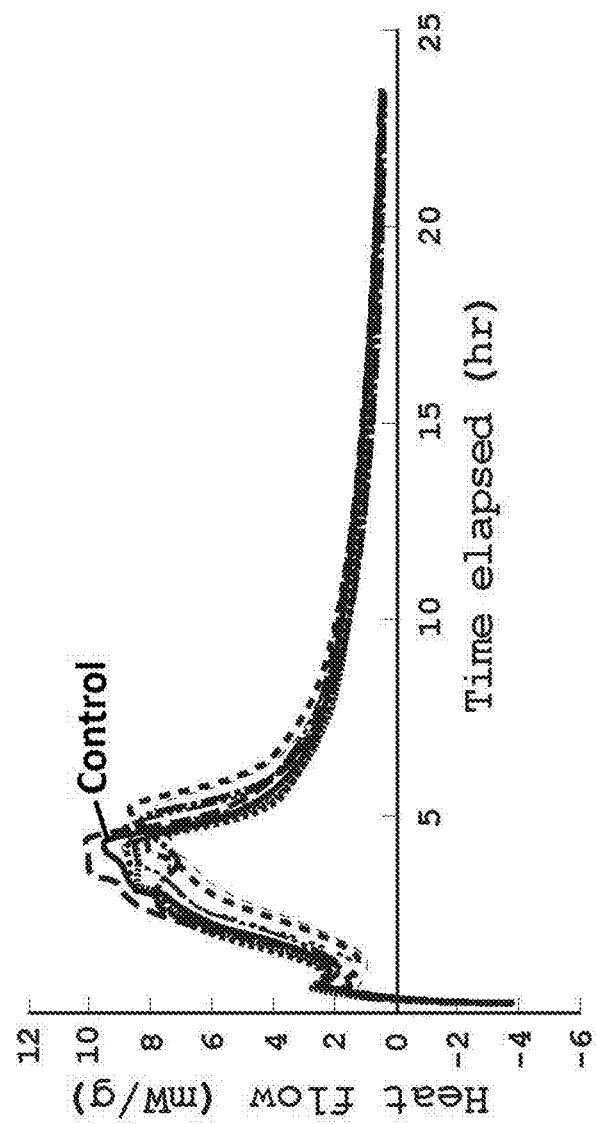
FIG. 5. Heat output curves for coloured mortars prepared using unformulated pigments and corresponding formulations prepared according to the invention. Heat output curves are shown overlain on the heat output curve for unadulterated cement (Control). All mortars were prepared using cement sourced from Dricon.

Heat output curves for coloured mortars prepared using the different sources of cement are presented in FIG. 3 (Golden Bay), FIG. 4 (Holcim) and FIG. 5 (Dricon). The absence of any significant variation between the heat flows measured confirms the compatibility between the colourants with the cementitious building material. By contrast, the effect on heat flows of the addition of a commonly used plasticizer (2% by weight of DC31) is shown in FIG. 1.

Compressive Strength

Colourants were added at a rate of 3% by weight to a slurry of cement (0.4 (w/w) water-cement) and the compressive strength of hardened blocks (50×50×50 mm) determined. Slurries were prepared using cement sourced from either Golden Bay or Holcim. The compressive strength determined for coloured hardened blocks prepared using these two sources of cement are presented in Table 2 (Golden Bay) and Table 3 (Dricon). Compressive strengths were also determined for coloured hardened blocks prepared by the addition of colourant at a rate of 3% by weight to a slurry of cement and sand (0.4 (w/w) water-cement and 1.5 (w/w) sand-cement). The compressive strengths determined for the coloured hardened blocks are presented in Table 4 (Golden Bay) and Table 5 (Dricon). The moderate reduction in strength (circa 10%) may be readily compensated for by addition of cement to the premix.

TABLE 2

Compressive strengths at 48 hours, 7 days and 28 days following hydration of coloured (3% (w/w) colourant) and uncoloured (control) hardened blocks prepared using cement (0.4 (w/w) water-cement) sourced from Golden Bay.

| Colourant | 48 hours | 7 days | 28 days |
| --- | --- | --- | --- |
| Control | 39.7 | 56.5 | 73.0 |
| Example 3 | 40.3 | 57.6 | 75.5 |
| Example 4 | 38.9 | 59.4 | 73.6 |
| Example 5 | 39.3 | 60.5 | 80.3 |
| Example 6 | 38.0 | 57.7 | 74.4 |

TABLE 3

Compressive strengths at 48 hours, 7 days and 28 days following hydration of coloured (3% (w/w) colourant) and uncoloured (control) hardened blocks prepared using cement (0.4 (w/w) water-cement) sourced from Dricon.

| Colourant | 48 hours | 7 days | 28 days |
| --- | --- | --- | --- |
| Control | 43.4 | 59.1 | 78.8 |
| Example 3 | 41.0 | 54.4 | 70.6 |
| Example 4 | 39.8 | 53.4 | 67.3 |
| Example 5 | 42.6 | 57.2 | 72.5 |
| Example 6 | 38.2 | 50.1 | 65.2 |

TABLE 4

Compressive strengths at 7 days and 28 days following hydration of coloured (3% (w/w) colourant) and uncoloured (control) hardened blocks prepared using a 1.5 (w/w) mixture of sand and cement (0.4 (w/w) water-mixture). The cement was sourced from Golden Bay.

| Sample | 7 days | 28 days |
| --- | --- | --- |
| Control | 52.1 | 61.9 |
| Example 3 | 47.8 | 57.6 |
| Example 4 | 42.4 | 54.9 |
| Example 5 | 46.9 | 57.5 |
| Example 6 | 46.7 | 59.0 |

TABLE 5

Compressive strengths at 7 days and 28 days following hydration of coloured (3% (w/w) colourant) and uncoloured (control) hardened blocks prepared using a 1.5 (w/w) mixture of sand and cement (0.4 (w/w) water-mixture). The cement was sourced from Dricon.

| Sample | 7 days | 28 days |
| --- | --- | --- |
| Control | 46.4 | 57.9 |
| Example 3 | 46.3 | 62.5 |
| Example 4 | 36.9 | 61.2 |
| Example 5 | 49.5 | 62.2 |
| Example 6 | 47.6 | 59.0 |

Colouring of Self-levelling Cementitious Floor Coverings

Figure 6:
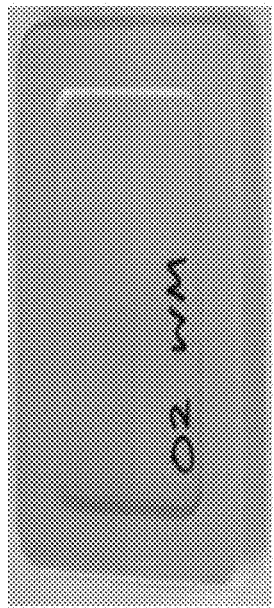
FIG. 6. Photographs of samples of the hardened cementitious floor levelling product SIKA™ LEVEL 30 (Sika (NZ) Limited) with (A) and without (B) the addition of colourant.
Figure 6:
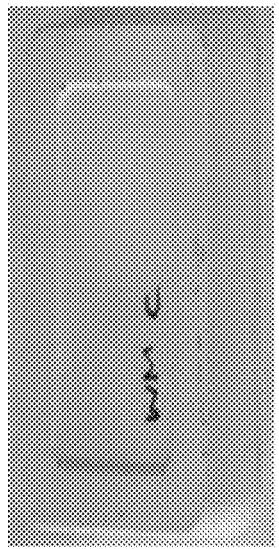

The surface of a contained area of floor substrate was cleaned and prepared according to the supplier's instructions prior to pouring of the cementitious floor levelling product SIKA™ LEVEL 30 (Sika (NZ) Limited). The colourant was added to the water used in mixing of the product at a ratio of 2% (w/w) of the product. The coloured concrete was then applied to the cleaned and prepared surface of the floor substrate. By contrast with commercially available formulations of iron oxide the addition of the colourant had no significant effect on air entrainment, workability, or curing and setting times. Photographs of samples of coloured and uncoloured white cement are provided in FIG. 6. Although provided in greyscale the photographs show the uniform distribution of the pigment throughout the hardened concrete.

Although the invention has been described with reference to embodiments or examples it should be appreciated that variations and modifications may be made to these embodiments or examples without departing from the scope of the invention. Where known equivalents exist to specific elements, features or integers, such equivalents are incorporated as if specifically referred to in this specification. In particular, variations and modifications to the embodiments or examples that include elements, features or integers disclosed in and selected from the referenced publications are within the scope of the invention unless specifically disclaimed. The advantages provided by the invention and discussed in the description may be provided in the alternative or in combination in these different embodiments of the invention.

REFERENCED PUBLICATIONS

Anon (2010) *Standard Specification for Pigments for Integrally Coloured Concrete* (C959/C959M) ASTM International, 100 Bar Harbour Drive, PO Box C 700, West Conshohocken, Pa. 19428-2959, United States.

Bowen (1980) *Cement Colouring Composition and Method of Producing Same* U.S. Pat. No. 4,204,876.

Dunnous and Yocum (2004) *Product and Method for Colouring Concrete* U.S. Pat. No. 6,695,990.

Hertz et al (2012) *Concrete Colouring Compositions and Methods* U.S. patent application Ser. No. 13/345,200 (publ. no. US 2012/0247372 A1).

Johansen et al (1999) *Method of Using a Colouring Composition in a Concrete-Based Composition* U.S. Pat. No. 5,951,752.

Jungk (1990) *Process for Dyeing Concrete* U.S. Pat. No. 4,946,505.

Köhler et al (1998) *Preparation and Use of Iron Oxide Black Pigment Granules* U.S. Pat. No. 5,718,755.

Kröckert and Linde (1993) *Process for Colouring Building Materials* U.S. Pat. No. 5,215,583.

Linde and Eitel (1996) *Process for the Colouration of Building Materials* U.S. Pat. No. 5,484,481.

Noack and Herrmann (2004) *Colouring Pigment Granulates and Method for Producing the Same* U.S. Pat. No. 6,824,604.

Supplee (2003) *Concrete Admixture with Improved Durability and Efflorescence Control Containing a Highly Resilient Colourant* U.S. Pat. No. 6,537,366.

Supplee (2007) *Integral or Shake-on Colourant Admixture with Improved Colour Durability in Concrete and Other Cementitious Systems Using Highly Resilient Colourants Organic or Oxide in Nature* U.S. patent application Ser. No. 11/760,421 (publ. no. US 2007/0294843 A1).

Tomkinson (1971) *Iron Oxide Pigments* U.S. Pat. No. 3,619,227.

Will (1998) *Process for Colouring Concrete Using Compacted Inorganic Granules* U.S. Pat. No. 5,853,476.

The invention claimed is:

1. A method of preparing a coloured self-levelling cementitious floor covering comprising the step of mixing a colourant with a cementitious floor covering premix used in forming of the coloured self-levelling cementitious floor covering where the colourant is a flowable, spray-dried, particulate formulation prepared from a mixture consisting essentially of, as ingredients, 85 to 95% by weight of one or more inorganic pigments, 3 to 7% by weight of poly(ethylene glycol) having a median molecular weight in the range 7,000 to 9,000, 3 to 6% by weight carboxylated acrylic co-polymer dispersant and 0.5 to 2.0% by weight where the formulation is prepared from a mixture of the ingedients in water.

2. The method of claim 1 where the one or more inorganic pigments are selected from the group consisting of: synthetic iron oxides; natural iron oxides; chromium oxide; cobalt blue; cobalt green; titanium dioxide and carbon black.

3. The method of claim 2 where the hydroxylated amine is 2-amino-2-methyl-1-propanol.

4. The method of claim 2 where the synthetic iron oxides are selected from the group cosisting of black, brown, red and yellow iron oxides; and the carbon black is concrete grade.

\* \* \* \* \*